Jan. 18, 1938. W. A. RUSH 2,105,989
TRAVELING BAG FOR AUTOMOBILES
Original Filed Sept. 16, 1932 2 Sheets-Sheet 2
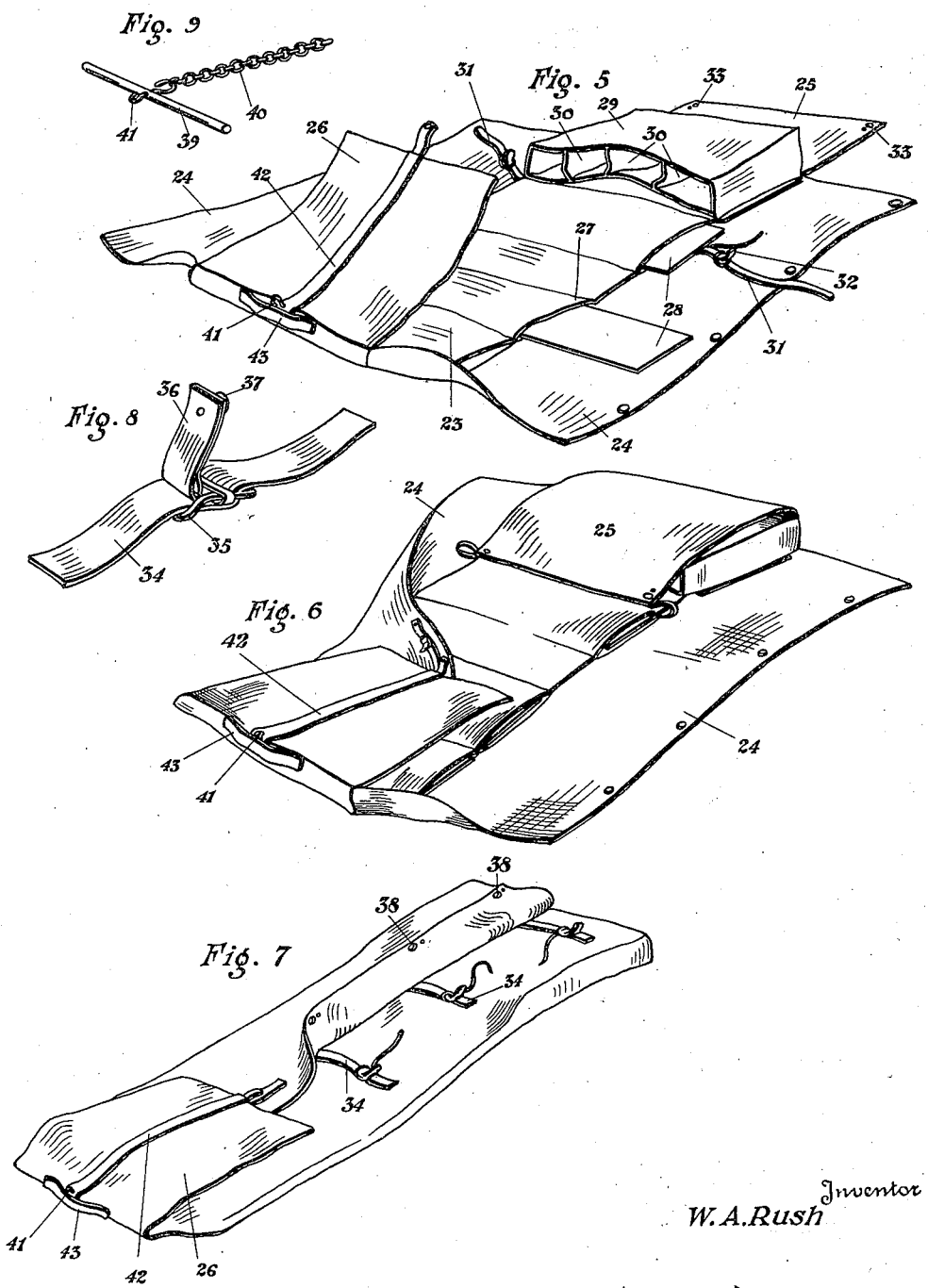
Inventor
W. A. Rush Patented Jan. 18, 1938

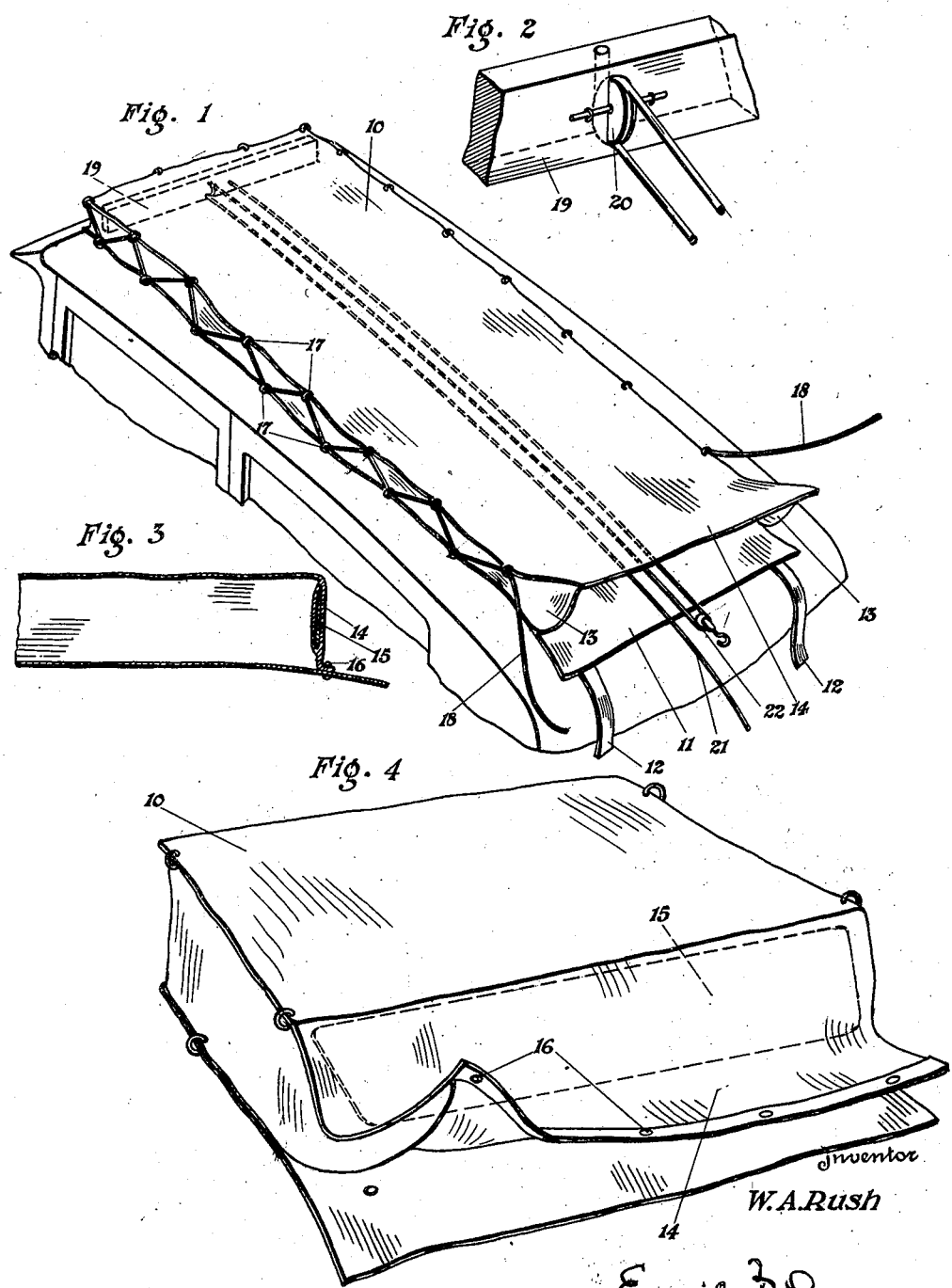

2,105,989

UNITED STATES PATENT OFFICE 2,105,989

TRAVELING BAG FOR AUTOMOBILES

Weaver A. Rush, Beatrice, Nebr.

Application September 16, 1932, Serial No. 633,538
Renewed August 29, 1935

1 Claim. (Cl. 224—29)

The present invention relates to traveling bags for automobiles and it is in the nature of an improvement on a similar traveling bag which is shown and described in my copending application, Serial Number 527,739, filed April 4, 1931, now Patent No. 2,090,986, dated Aug. 24, 1937.

In general the objects of the present invention are similar to those in my prior application but the present application embodies certain improvements having other objects.

One of these objects is the provision of a bag fitting over the top of the automobile, the bag having a box-like form and being collapsible to various degrees depending on the contents.

Another of these objects is the provision of a bag of box-like form with adjusting devices arranged so that the flapping and chattering from wind pressures during driving will be eliminated.

Another of my objects is the provision of a pulley arrangement in combination with a traveling bag for drawing the contents into the bag, the relation between the pulley device and the bag being novel.

Another of the objects is the provision of a rear closure for the bag, the closure being of novel form.

Another of my objects is the provision of an inner bag having a novel sliding relationship past the closure of the outer bag.

Another of the objects of the invention is the provision of an inner bag which is reinforced transversely but which is foldable along certain transverse lines.

Another of the objects is the provision of snap fasteners with means for adjusting the snap fasteners in accordance with the thickness of the contents of the inner bag.

Having in view these objects and others which will be pointed out in the following description, I will now refer to the drawings, in which—

Figure 1 is a view in perspective of the top of an automobile with my traveling bag positioned thereon.

Figure 2 is a perspective vew of a portion of the pulley block in the forward or closed end of my traveling bag.

Figure 3 is a longitudinal sectional view of the rear end portion of the traveling bag.

Figure 4 is a perspective view of the parts shown in Figure 3 but showing also the snap fastening devices.

Figure 5 is a perspective view of the inner bag with some of the reinforcing slides partly withdrawn to show their relationship to the inner bag structure.

Figure 6 is a view similar to Figure 5 but showing the bottom rearward end portion of the inner bag folded.

Figure 7 is a perspective view showing the inner bag in partly folded position and showing particularly the snap fastening device.

Figure 8 is a view in perspective showing the details of the snap fastener device whereby the snap fastener may be easily adjusted in position.

Figure 9 is a perspective view of the chain on which the articles of wearing apparel are supported.

The bag 10 as shown in Figure 1 is in box form having a top and a bottom and two closed side walls and a closed front wall. The entire bag is preferably made from flexible material like water-proof duck. The bottom wall is provided with a flap 11 which is adapted to rest on the rounded rear edge of the roof of the automobile as shown in Figure 1. As in my prior construction, straps 12 are slidably secured to the bottom wall of the bag 10 and they are adapted to be fastened to automobile parts to hold the bag firmly under tension against the roof of the automobile. These straps 12 will thus hold the flap 11 in position. The rear ends 13 of the side walls are rounded as shown in Figure 1 so that the rear end portion 14 of the top wall of the bag may be raised to provide a wide opening for the bag.

As shown in Figures 3 and 4, the flap 14 is provided with a reinforcement 15 in the form of a rigid or semi-rigid material inserted between two layers of the material from which the bag is formed. The flap 14 is provided with snap fasteners 16 cooperating with their complementary snap fastener members on the flap 11 as shown in Figure 4.

The top and bottom side edges of the bag are provided with rings 17 as shown in Figure 1, the upper and lower rings being staggered with relation to each other. The cords 18 are passed through these rings in such a way that tension applied to them will tend to collapse the side walls. The purpose of this construction is to provide means for holding the bag and its contents taut regardless of the thickness of the contents of the bag. The bag is filled or partly filled with the contents after which the cords 18 are drawn taut and secured in their end portions to any fixed parts of the automobile. If the bag were only partly filled and then not collapsed and held taut, the variations in pressure during driving would cause the bag to expand and contract and to be responsive to gusts of wind which would cause it to chatter and also to flap to a certain extent. The collapse of the bag by means of the cords 18 also reduces the free volume of air within the bag and thus eliminates all chattering. The construction, moreover, has the advantage in preventing the sucking in of dust-laden air due to expansion and contraction of the volume of air within the bag.

The forward end portion of the bag 10 is reinforced by means of the block 19. This block has a width less than the thickness of the bag 10 as shown in Figure 1 but the forward end of the bag 10 may be collapsed against the upper edge of the block 19. The main function of the block 19 is to serve as a support for the pulley 20 which is journaled in and partly embedded in the block 19. The pulley 20 guides the movement of the cord or other similar flexible member 21. One end of this cord is firmly secured to the block 19 while the other end is adapted to be grasped to draw the pulley 22 with its hook into the bag.

The inner bag is shown fully expanded in Figure 5. This consists of a bottom or body member 23, two side flaps 24, a rear end flap 25 and a forward end flap 26. The body member 23 is folded upon itself and the two parts are stitched together along transverse lines 27 leaving pockets having openings at one or both sides. Reinforcements 28 are inserted into these pockets, these reinforcements being preferably in the form of cardboard or other similar stiffening material. The bag may be folded upon itself along the lines of the transverse seams but it is sufficiently stiff because of the reinforcements 28 to maintain its form either in the outer bag or while it is suspended from a hook in the closet.

At the lower end of the body portion is a compartment 29 for receiving shoes, rubbers, and similar articles which might soil the other wearing apparel. The compartment 29 is in box form and it is subdivided by means of partitions 30 for keeping the contents separated from each other. The flap 25 is adapted to be folded over the compartment 29 to close the compartment as shown in Figure 6. Secured to the body portion 23 is a strap 31 which is provided with slides 32 each having one member of a snap fastener to cooperate with an eye member 33 of the flap 25. The arrangement is similar to that shown in detail in Figure 8 which makes it possible to adjust the slide 32 along the strap so as to bring the snap fastener member thereof into convenient position for engagement with the eye member 33 regardless of the degree of fullness with which the compartment 29 is packed.

The two side flaps 24 are foldable over the body portion 23 and over the flap 25, the bag being shown in partly folded position in Figure 6. One of the two side flaps 24 is provided with straps 34 rigidly secured to the flap and having slides 35 which may be moved lengthwise of the strap. These slides carry straps 36 with the button members 37 of snap fasteners secured thereto. The other side flap 24 is provided with a plurality of eyelets 38 for engaging the button members 37. The wearing apparel is contained in the bag between the body member 23 and the flaps 24. The quantity of this wearing apparel necessarily determines the thickness of the bag when it is filled and this determines the position of the buttons 37. The arrangement is such that these buttons 37 may readily be shifted to any necessary position for snugly closing and latching the side flaps 24 over the body portion 23. The wearing apparel is inserted into the bag in much the same way as in the traveling bag described in my prior application. A cross arm 39 with a chain 40 and a hook 41 is employed so that all of the articles of wearing apparel may be removed at one time from the bag and so that they may be suspended from a hook in the closet or bedroom by means of the hook 41.

The forward end flap 26 closes down over the side flaps 24 in the manner shown in Figure 7. This flap is provided with a strap 42 and with a handle 43. The strap 42 serves as a reinforcement but it also has a very important function in the relation of the inner and outer bags. The outer bag necessarily remains in place on the automobile top when a stop is made for the night. In filling the outer bag by inserting the inner bag, the cords 18 are first loosened to permit expansion of the outer bag so that the inner bag can be readily inserted. The hook on the pulley 22 is caused to engage the hook 41 at the end of the inner bag whereupon tension on the cord 21 will draw the entire inner bag with its contents into the outer bag. The flap 24 would, however, cause more or less interference with the insertion of the inner bag were it not for the strap 42. This strap engages the edge of the flap 14 at the reenforced portion 15 and spaces that flap slightly from the flap 26. The friction of the strap 42 against the rigid flap 14 causes the flap to be drawn inwardly into the outer bag. After the inner bag has been inserted into the outer bag, the flap 14 may be drawn out of the outer bag by hand and secured by means of the snap fastener 16. When removing the inner bag from the outer bag, the strap 42 again engages the rigid flap 14 and the frictional movement keeps open the mouth of the outer bag.

Having thus described my invention in such full, clear, and exact terms that its construction and operation will be readily understood by others skilled in the art to which it pertains, what I claim as new and desire to secure by Letters Patent of the United States is:

In combination, an outer bag of flexible material adapted to be placed upon the top of an automobile and having a width less than that of the top of the automobile and a length substantially equal to that of the top of the automobile, the outer contour of the bag conforming substantially to that of the top, said bag having collapsible side walls, said bag being adapted to receive a collapsible inner bag, means for securing the outer bag in position upon the top of the automobile, a plurality of rings carried by the top side edge of said outer bag and a plurality of rings carried by the lower side edge of said outer bag and in staggered relation to the first mentioned rings, and a cord threaded through said rings whereby, when the cord is drawn, the side walls of the outer bag will be collapsed to an extent depending upon the thickness of the inner bag to draw the outer bag tightly about the inner bag.

WEAVER A. RUSH.